United States Patent [19]

Watanabe et al.

[11] Patent Number: 4,828,017
[45] Date of Patent: May 9, 1989

[54] COOLING DEVICE FOR OFF-ROAD VEHICLE

[75] Inventors: Seiji Watanabe; Akio Handa; Eiji Hosoya; Makoto Ishiwatari; Yoshihiro Kimura; Takerou Shibukawa, all of Saitama, Japan

[73] Assignee: Honda Giken Kogyo Kabushiki Kaisha, Tokyo, Japan

[21] Appl. No.: 113,221

[22] Filed: Oct. 23, 1987

[30] Foreign Application Priority Data

Oct. 23, 1986 [JP] Japan .................................. 61-253382
Oct. 23, 1986 [JP] Japan .................................. 61-253383
Oct. 23, 1986 [JP] Japan .................................. 61-253384

[51] Int. Cl.⁴ .......................................... B60K 11/04
[52] U.S. Cl. .................................... 165/41; 180/68.4; 180/68.6; 296/205
[58] Field of Search .................. 165/41; 296/185, 186, 296/205, 203; 180/229, 68.4, 68.6; 280/289 R, 756

[56] References Cited

U.S. PATENT DOCUMENTS

| | | | |
|---|---|---|---|
| 4,253,535 | 3/1981 | Kleine et al. | 180/6.24 |
| 4,453,763 | 6/1984 | Richards | 296/185 |
| 4,461,366 | 7/1984 | Honda | 180/229 |
| 4,535,866 | 8/1985 | Shiga | 180/215 |
| 4,629,023 | 12/1986 | Carpanelli et al. | 180/72 |
| 4,641,854 | 2/1987 | Masuda et al. | 280/701 |
| 4,667,758 | 5/1987 | Tamura | 180/68.4 |
| 4,687,069 | 8/1987 | Inomata et al. | 180/68.2 |

FOREIGN PATENT DOCUMENTS

| | | |
|---|---|---|
| 50-42274 | 12/1975 | Japan . |
| 51-109519 | 9/1976 | Japan . |
| 53-17532 | 5/1978 | Japan . |
| 54-19606 | 7/1979 | Japan . |
| 60-134042 | 9/1985 | Japan . |

Primary Examiner—Samuel Scott
Assistant Examiner—Allen J. Flanigan
Attorney, Agent, or Firm—Irving M. Weiner; Joseph P. Carrier; Pamela S. Burt

[57] ABSTRACT

A cooling device is mounted on an off-road vehicle including a vehicle frame having a pair of main pipe members spaced from each other transversely of the vehicle and extending longitudinally of the vehicle, the main pipe members having rear portions joined to each other, a central roll bar mounted on the main pipe members substantially centrally in their longitudinal direction, and a rear roll bar coupled between the rear ends of the main pipe members and the central roll bar, and an engine mounted on a lower portion of the vehicle frame rearwardly of the central roll bar. The cooling device includes a radiator positioned in a space surrounded by the main pipe members, the central roll bar, and the rear roll bar, and mounted on a support pipe extending and joined between the main pipe members. The cooling device also has a shroud attached to the rear surface of the radiator, and a fan motor fixedly accommodated in the shroud.

12 Claims, 9 Drawing Sheets

COOLING DEVICE FOR OFF-ROAD VEHICLE

BACKGROUND OF THE INVENTION

1. Field of the Invention

The present invention relates to a cooling device for use on an off-road vehicle, and more particularly to a structure for arranging a cooling device in position on an off-road vehicle.

2. Description of the Relevant Art

Japanese Laid-Open Patent Publication No. 60/134042, for example, discloses an off-road vehicle including a vehicle frame primarily comprising a pair of main pipes spaced from each other transversely of the vehicle and extending longitudinally thereof, the main pipes having rear ends joined to each other, a central roll bar of a substantially inverted U shape mounted longitudinally on the main pipes, and a rear roll bar interconnecting the rear ends of the main pipes and the upper end of the central roll bar. A driver's seat is disposed between the main pipes in front of the central roll bar. An engine is disposed between the main pipes behind the central roll bar.

Air-cooled engines are generally employed in off-road vehicles. Where a water-cooled engine is mounted on an off-road vehicle, care should be exercised in selecting the position where the radiator is installed. More specifically, the radiator should be positioned so as to prevent it from being hit by small stones and other foreign matter. The radiator should also be easily accessed for maintenance without disassembling the complex vehicle frame.

To cool cooling water flowing through the radiator, a fan rotatable by a fan motor is provided behind the radiator. As shown in Japanese Laid-Open Utility Model Publication No. 50/42274, for example, the fan is supported on a bracket or an attachment stay mounted on the engine. Since the radiator on the frame of the off-road vehicle is exposed, it is necessary to locate fan attachment components in a position concealed from external view and also to reduce the number of such fan attachment components so that the fan as it is installed will be advantageously good appearance.

If a reservoir tank is associated with the radiator, the reservoir should be positioned as closely to the radiator as possible and at substantially the same height as the radiator. This is because a pipe between the reservoior and the radiator can be shortened, the layout of the reservoir and the radiator can advantageously be developed, and a sufficient amount of cooling water can be drawn from the reservoir tank when the temperature of cooling water in an upper tank of the radiator is lowered and a vacuum is produced in the upper tank. However, the arrangement of the reservoir tank and the radiator should be carefully designed since if the reservoir tank was located immediately in front of the radiator and at the same height as the radiator, a sufficient amount of air would not be supplied to the core of the radiator.

SUMMARY OF THE INVENTION

Therefore, it is a primary object of the present invention to provide a cooling device for an off-road vehicle which can be effectively protected from foreign matter without adding special components to an exisiting off-road vehicle frame.

Another object of the present invention is to provide a cooling device for an off-road vehicle, which can be easily maintained.

Still another object of the present invention is to provide a cooling device for an off-road vehicle which is of a high cooling efficiency.

A further object of the present invention is to provide a cooling device for an off-road vehicle which has a good appearance, made up of a reduced number of parts, and is lightweight.

According to an embodiment of the present invention, there is provided a cooling device in an off-road vehicle including a vehicle frame having a pair of main pipe members spaced from each other transversely of the vehicle and extending longitudinally of the vehicle, the main pipe members having rear portions joined to each other, a central roll bar mounted on the main pipe members substantially centrally in their longitudinal direction, and a rear roll bar coupled between the rear ends of the main pipe members and the central roll bar, and an engine mounted on a lower portion of the vehicle frame rearwardly of the central roll bar. The cooling device includes radiator positioned in a space surrounded by the main pipe members, the central roll bar, and the rear roll bar, and mounted on a support pipe extending and joined between the main pipe members. With this arrangement, the radiator can be protected from being hit by foreign matter without adding any special attachment member to the existing frame.

Since the cooling device is disposed above the engine, the cooling device can be maintained or serviced by simply removing the rear roll bar from the vehicle frame.

A fan motor for rotating a fan for cooling the radiator is accommodated and fixedly positioned in a shroud. The shroud has upper and lower portions secured to upper and lower tanks, respectively, of the radiator. Thus, the fan motor can be supported on the radiator without adding any special attachment stay to the vehicle frame or engine. This structure results in a better appearance especially for the off-road vehicle in which the radiator is exposed to view.

The radiator is connected to a reservoir tank having an upwardly curved upper surface which has a rear edge dipsosed closely to and lying at substantially the same height as the lower edge of a radiator core. The upper surface of the reservoir tank functions to effectively supply a sufficient amount of ram air to the radiator core, and also functions to effectively draw a sufficient amount of cooling water from the reservoir tank positioned directly below the radiator when a vacuum is developed in the upper tank of the radiator.

According to another embodiment of the present invention, there is also provided a cooling device in an off-road vehicle including a vehicle frame having a pair of main pipe members spaced from each other transversely of the vehicle and extending longitudinally of the vehicle, the main pipe members having rear portions joined to each other, a central roll bar mounted on the main pipe members substantially centrally in their longitudinally direction, and a rear roll bar coupled between the rear ends of the main pipe members and the central roll bar, and an engine mounted on a lower portion of the vehicle frame rearwardly of the central roll bar. The cooling device comprises two laterally spaced radiators for cooling the engine in order to keep the engine at a temperature suitable for operation thereof, the radiators being positioned in a space surrounded by the main pipe members, the central roll bar, and the rear roll bar, and mounted on the central roll bar.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
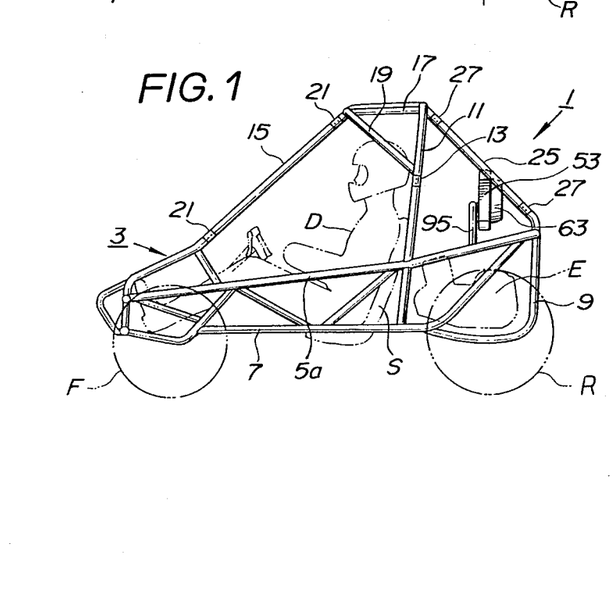
FIG. 1 is a side elevatinal view of an off-road vehicle, with a cooling device mounted thereon according to an embodiment of the present invention.
Figure 2:
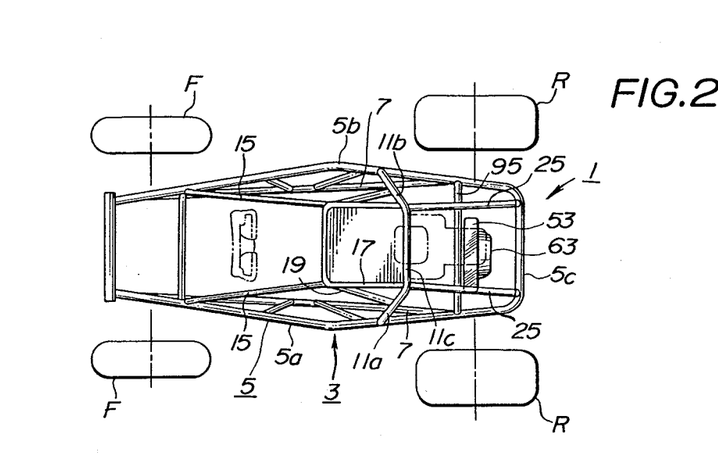
FIG. 2 is a plan view of the off-road vehicle.
Figure 3:
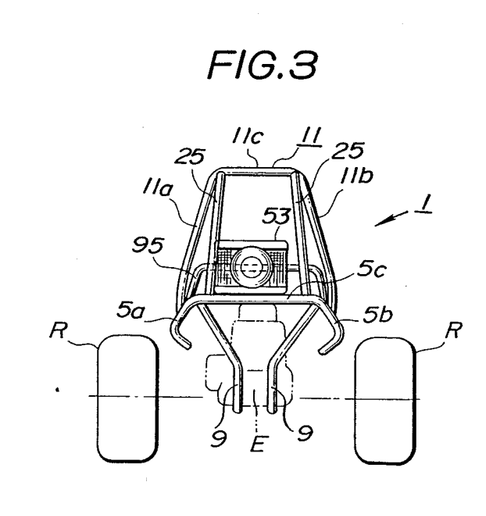
FIG. 3 is a rear view of the off-road vehicle.

As shown in FIGS. 1 through 3, an off road vehicle, generally designated by the reference numeral 1, has a vehicle frame 3 comprising a main pipe 5 including a pair of side members 5a, 5b spaced from each other in the transverse direction of the vehicle 1 and extending substantially horizontally in the longitudinal direction of the vehicle 1, and a rear member 5c interconnecting the side members 5a, 5b, a pair of laterally spaced seat support pipes 7 extending below the main pipe 5 in the longitudinal direction of the vehicle 1 and having upwardly curved rear portions with their rear ends joined to the rear member 5c of the main pipe 5, the seat support pipes 7 supporting a driver's seat S, a pair of rear lower pipes 9 interconnecting the rear member 5c of the main pipe 5 and the curved portions of the seat support pipes 7, and a plurality of roll bars for protecting the driver D when the vehicle 1 flips. Two front wheels F are rotatably supported on a front portion of the vehicle frame 3, and two rear wheels R are rotatably supported on a rear portion of the vehicle frame 3.

The roll bars include a central roll bar 11 of a substantially inverted U shape mounted centrally on the main pipe 5 in its longitudinal direction. The central roll bar 11 has a pair of laterally space legs 11a, 11b and a connecting portion 11c joining the legs 11a, 11b to each other. Each of the legs 11a, 11b has a joint 13 at a substantially intermediate portion thereof. By detaching the joints 13, an upper half of the central roll bar 11 can be removed from the vehicle frame 3. To the central roll bar 11, there are coupled the upper ends of two laterally spaced front roll bars 17 through two roof pipes 15 and two laterally spaced slanted stays 19. The front roll bars 15 have lower ends joined to the front ends of the main pipe 5 and the seat support pipes 7. Each of the front roll bars 15 has two joints 21 which can be detached to remove the front roll bars 15 from the vehicle frame 3. Two laterally spaced rear roll bars 25 are joined between the connecting portion 11c of the central roll bar 11 and the rear member 5c of the main pipe 5. Each of the rear roll bars 25 has two joints 27 which can be detached to remove the rear roll bars 25 from the vehicle frame 3.

Figure 4:
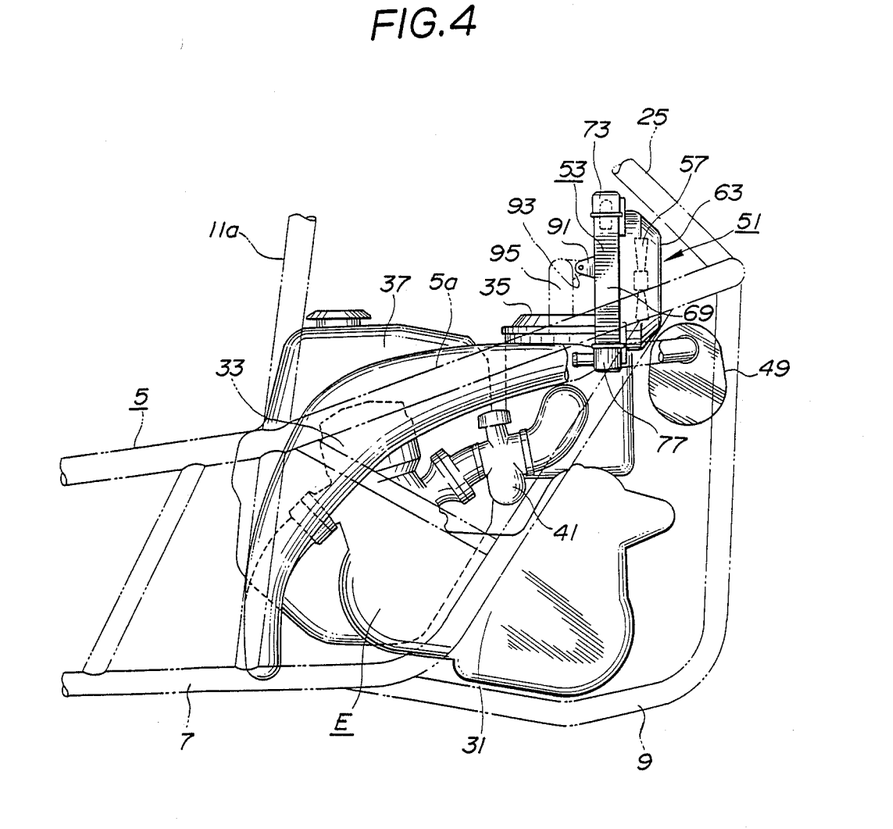
FIG. 4 is an enlarged side elevational view of the cooling device installed in the off-road vehicle, with a radiator grille and a reservoir tank omitted from illustration.
Figure 5:
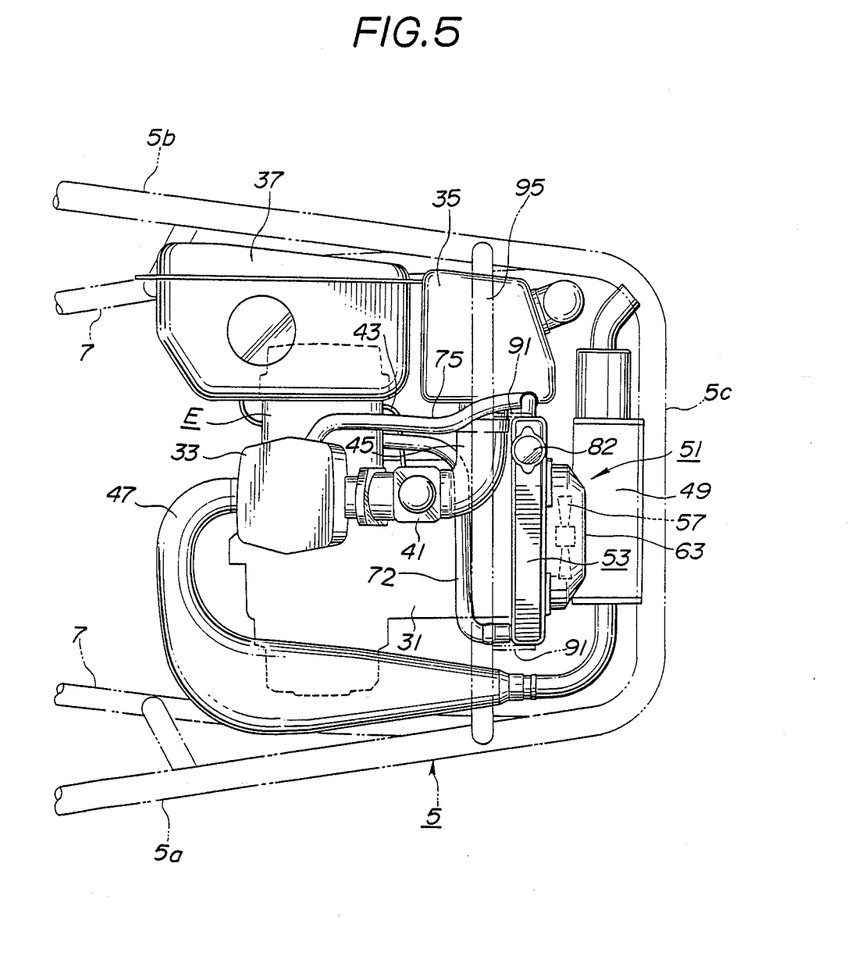
FIG. 5 is an enlarged plan view of the cooling device shown in FIG. 4.
Figure 6:
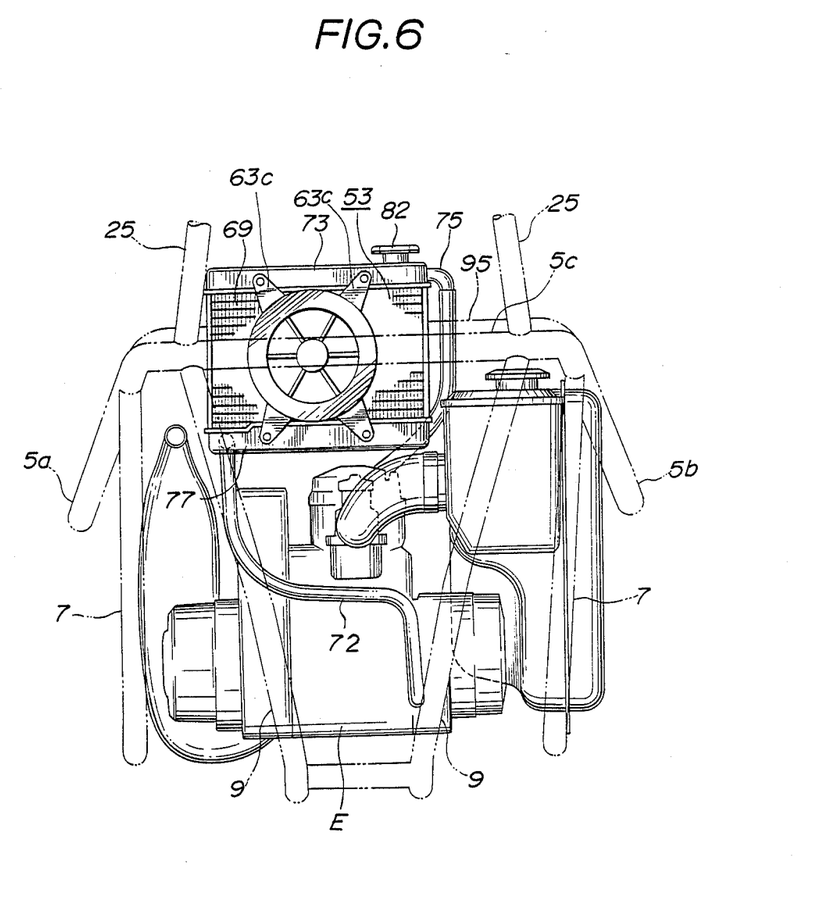
FIG. 6 is an enlarged rear view of the cooling device of FIG. 4.

As shown in FIGS. 4 through 6, an engine E is mounted on a rear lower portion of the off-road vehicle 1, i.e., on the rear lower pipes 9 behind the driver's seat S. The engine E has a transmission case 31 housing a transmission (not shown) and a cylinder 33 projecting upwardly from a front portion of the transmission case 31. An air cleaner 35 and a fuel tank 37 are mounted on the righthand main pipe member 5b ( as viewed in FIG. 6) through brackets or other suitable mounting means on the righthand side of the engine E. The fuel tank 37 is connected to a carburetor 41 on an intake manifold 45 through a fuel supply hose 43. Fuel can be fed from the fuel tank 37 to the carburetor 41 by a fuel pump (not shown). The intake manifold 45 has one end coupled to the air cleaner 35 and the other end to the cylinder 33. A mixture of air and fuel is burned in the cylinder 33, and exhaust gasses are emitted from the cylinder 33 through an exhaust pipe 47 coupled to the cylinder 33 and then discharged into atmosphere from a muffler 49 joined to the exhaust pipe 47 while the temperature and pressure of the exhaust gasses are lowered by the muffler 49.

Figure 7:
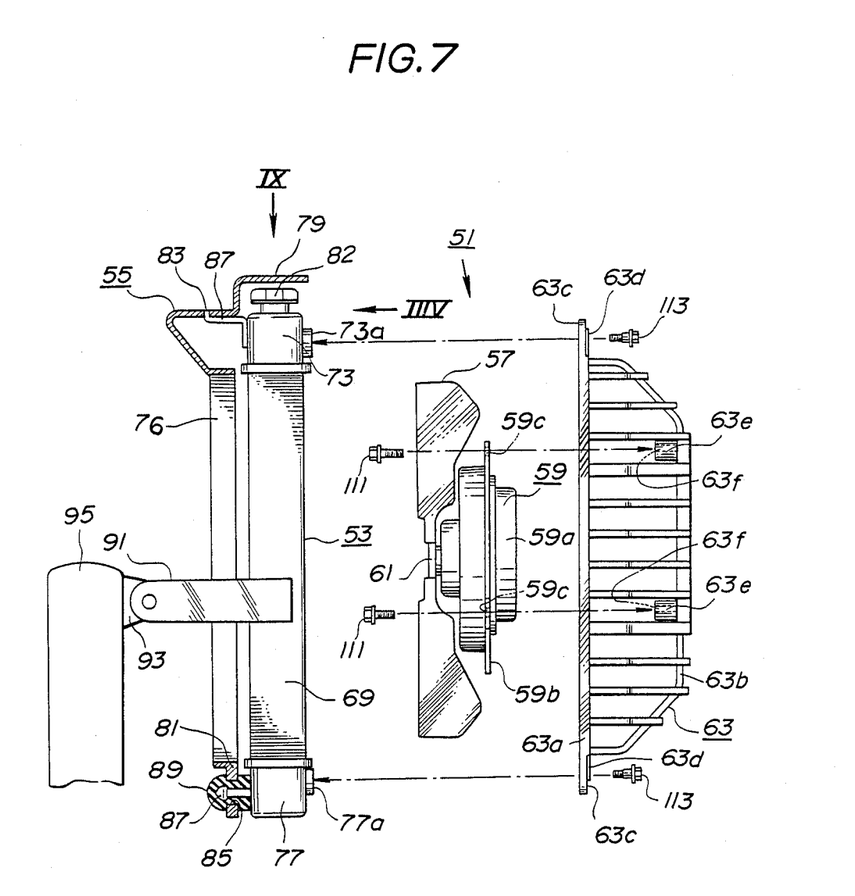
FIG. 7 is an exploded elevational view, partly in cross section, of the cooling device, with the reservoir tank omitted from illustration.

As shown in FIG. 7 in greater detail, a cooling device, generally denoted at 51, is constructed of a radiator 53, radiator grille 55 attached to the front face of the radiator 53 for directing ram air to the radiator 53 and protecting the front face of the radiator 53 from small stones or other foreign matter, a fan 57 disposed behind the radiator 53 for drawing an through a radiator core 69 an electric fan motor 59 having an output shaft 61 supporting the fan 57, and a shroud 63 for protecting the fan 57.

The radiator core 69 includes a number of cooling fins 71 (FIG. 8) made of a suitable material of good thermal conduction such as thin brass sheet, and a plurality of tubes (not shown) for the passage of cooling water therethrough. An upper tank 73 is mounted on the top of the radiator core 69 and held in communication with the interior of the cylinder head of the cylinder 33 through an inlet hose 75 (FIGS. 5 and 6). A lower tank 77 is attached to the bottom of the radiator core 69, the lower tank 77 communicating with the interior of the engine E through an outlet hose 72.

The cooling device serves to keep the engine E at suitable temperature for enabling the engine E to perform its operation sufficiently under all operating conditions. Cooling water is forced to circulate through the cylinder 33 by a water pump, for example. When the temperature or higher, a thermostat (not shown) operates to direct the cooling water to the radiator 53. The heat of the cooling water is radiated by the radiator core 69 to thereby lower the temperature of the cooling water, with the result that the engine E is kept at desired temperature at all times.

More specifically, as shown in FIGS. 5 and 6, when the cooling water circulating in a water jacket (not shown) in the cylinder 33 is heated by the heat of the wall surface of the cylinder 33, the thermostat is actuated to allow the heated cooling water to flow through the inlet hose 75 into the upper tank 73 of the radiator 53. Then, the cooling water flows from the upper tank 73 into the raidator core 69 in which the heat of the cooling core passing through the tubes is radiated by cooling air which flows along the surfaces of the fins 71. At this time, since the cooling air flows along the surfaces of the fins 71 at an increased speed upon rotation of the fan 57 by the electric fan motor 59, the cooling efficiency is high. After having passed through the radiator core 69, the cooling water flows into the lower tank 77 and then is forced by the water pump (not shown) through the outlet hose 72 into the engine E to keep the engine E at the desired temperature.

Figure 8:
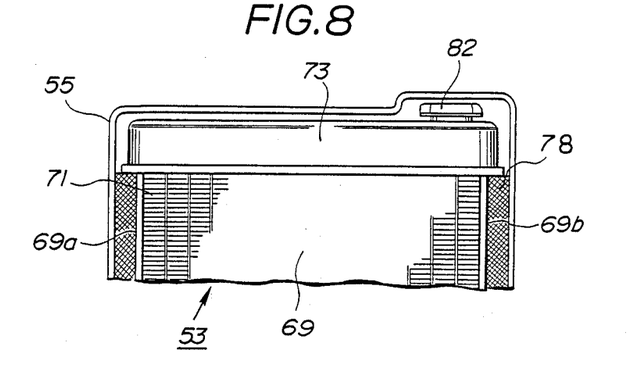
FIG. 8 is a fragmentary elevational view of the cooling device, taken along line VIII of FIG. 7.
Figure 9:
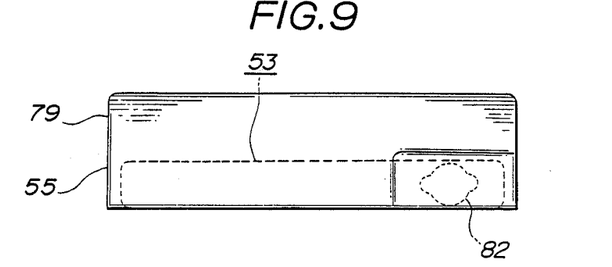
FIG. 9 is a plan view of the cooling device, taken along line IX of FIG. 7.

As illustrated in FIGS. 7 and 8, the radiator grille 55 is in the form of a unitary structure molded of synthetic resin having a substantially inverted U shape, as viewed in front elevation, the radiator grille 55 having an upward extension extending from one side toward its top in overhanging relation to a radiator cap 82 on the upper tank 73 for preventing accidental detachment of the radiator cap 82. The radiator grille 55 includes an air guide 76 having a metal screen 78 extending over the radiator core 69 for protecting the radiator core 69 against damage which would otherwise result from being hit by small stones or foreign matter. The radiator grille 55 has upper and lower portions 79, 81 having attachment holes 83, 85, respectively. An attachment member 87 mounted on the front face of the upper tank 73 has its distal end inserted into the attachment hole 83. A pin 87 projecting from the front face of the lower tank 77 and covered with a grommet 89 is fitted in the attachment hole 85.

Side covers 69a, 69b (FIG. 8) are attached to the respective opposite sides of the radiator core 69, with brackets 91 fixed respectively to the side cores 69a, 69b. The brackets 91 are aligned with respective brackets 93 projecting rearwardly from a cross pipe 95 joined between rear portions of the side members 5a, 5b of the main pipe 5. The radiator 51 is attached to the cross pipe 95 by fastening the brackets 91, 93 together by bolts and nuts.

As shown in FIGS. 6 and 7, the fan motor 59 is supported on the shroud 63 which is in turn directly mounted on the radiator 53. More specifically, the shroud 63 comprises a substantially circular base plate 63a and an air guide 63b disposed behind and integral with the base plate 63a. The base plate 63a has four brackets 63c extending radially outwardly and held in diametrically opposite relation in each pair, the brackets 63c having attachment holes 63d defined in their distal ends. The air guide 63b has a plurality of attachment seats 63e for supporting the fan motor 59. The fan motor 59 has a case 59a having a radially outwardly extending flange 59b. For installation of the fan motor 59, the flange 59b thereof is held against the attachment seats 63e of the shroud 63, and holes 59c defined in the flange 59b are brought into registry with respective holes 63f defined in the attachment seats 63e. Then, bolts 111 are threaded through the holes 59c into the holes 63f to thereby attach the fan motor 59 together with the fan 57 on the output shaft 61 of the fan motor 59 to the shroud 63. Thereafter, the base plate 63a of the shroud 63 is held against the rear surface of the radiator 53, and the attachment holes 63d in the bracket 63c are registered with attachment seats 73a, 77a mounted on the rear surfaces of the upper and lower tanks 73, 77 and having internally threaded holes. Then, bolts 113 are threaded through the holes 63d into the attachment seats 73a, 77a. The fan motor 59 can therefore be supported on the radiator 53 without requiring any special attachment stay to be attached to the vehicle frame or the engine body.

Figure 10:
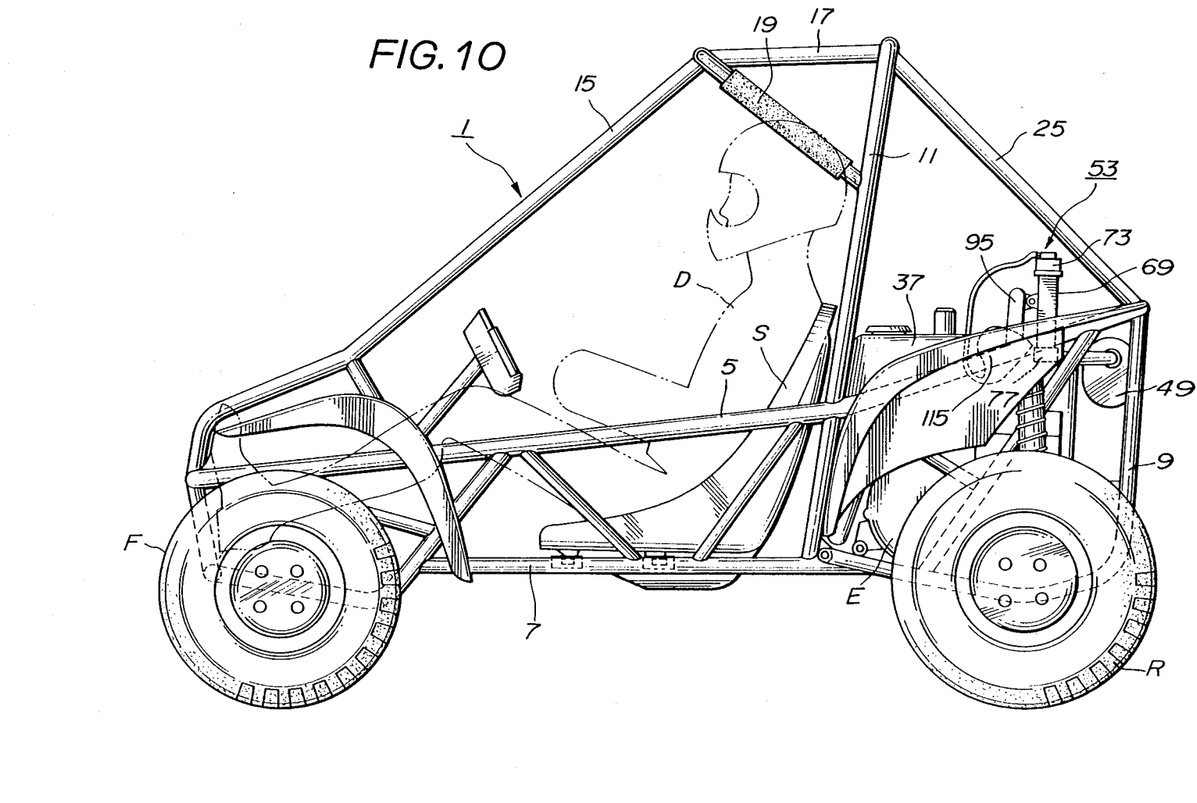
FIG. 10 is a side elevational view of the off-road vehicle with a reservoir tank connected to the radiator.
Figure 11:
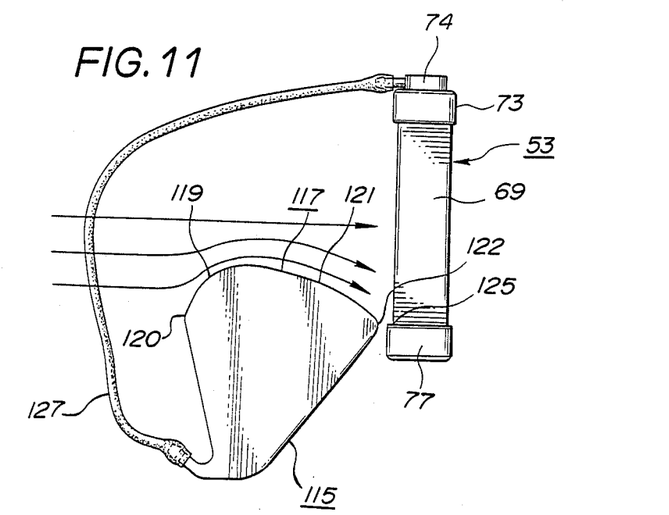
FIG. 11 is an enlarged side elevational view of the radiator and the reservoir tank shown in FIG. 10.
Figure 12:
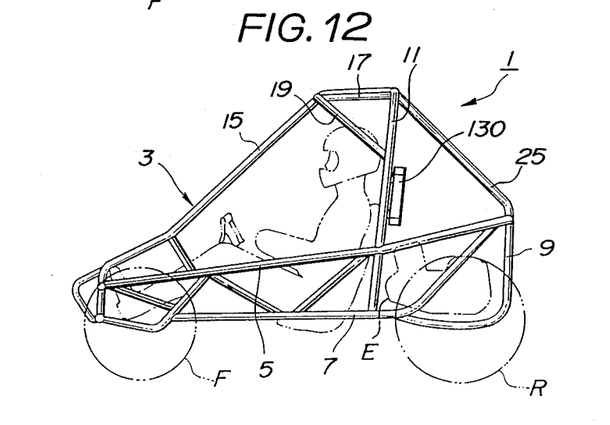
FIG. 12 is a side elevational view of an off-road vehicle, with a cooling device mounted thereon according to another embodiment of the present invention.
Figure 13:
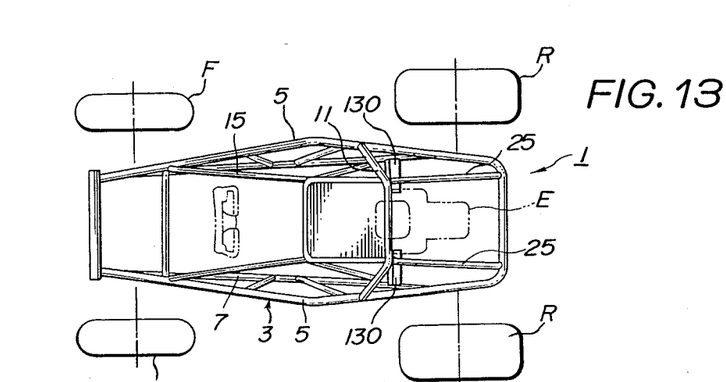
FIG. 13 is a plan view of the off-road vehicle shown in FIG. 12.
Figure 14:
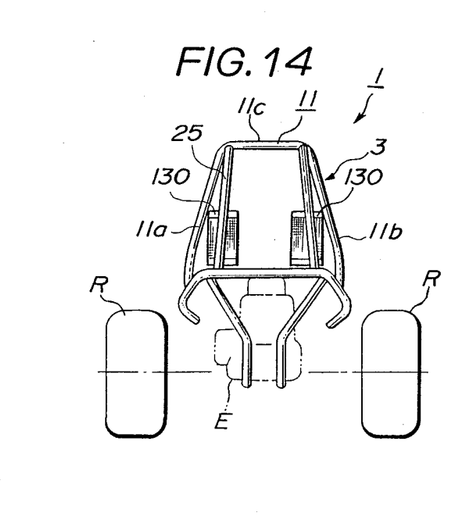
FIG. 14 is a rear view of the off-road vehicle illustrated in FIG. 12.

As shown in FIGS. 10 and 11, a reservoir tank 115 may be connected to the radiator 53. The reservoir tank 115 is fixed to the cross pipe 95 by brackets (not shown). As illustrated in FIG. 11, the reservoir tank 115 has an upper surface 117 including a first curved portion 119 obliquely rising from a front edge 120 thereof, and a second curved portion 121 having a smaller gradient than that of the front curved portion 119 and extending therefrom toward a rear edge 122. The front and rear edges 120, 122 are positioned in horizontal alignment with the lower edge 125 of the radiator core 69. During travel of the vehicle 1, ram air is guided by the upper surface 117 of the reservoir tank 115 effectively toward the entire front face of the radiator core 69. The upper tank 73 has a water inlet 74 coupled to the reservoir tank 115 through a hose 127.

When the temperature of the cooling water as it flows through the water jacket is increased by the heat of the cylinder wall surface, the volume of the cooling water is increased, and the excessive water flows from the upper tank 73 via the hose 127 into the reservoir tank 115. Conversely, when the cooling water temperature drops, a vacuum is developed in the upper tank 73 to draw cooling water from the reservoir tank 115 back into the upper tank 73. Therefore, the cooling water can be utilized effectively without a wasteful overflow. The reservoir tank 115 is disposed closely to the radiator 53 without presenting an obstacle in front of the radiator 53. A sufficient amount of cooling water can be returned from the reservoir tank 115 to the upper tank 73.

Figure 15:
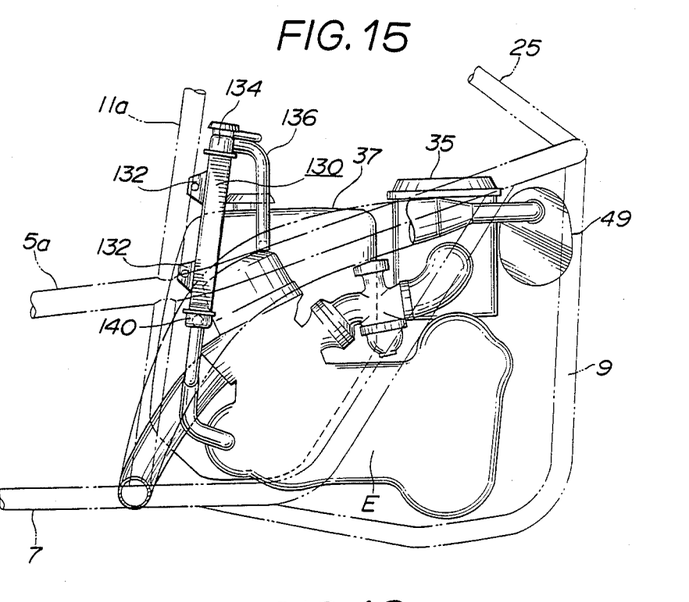
FIG. 15 is an enlarged side elevational view of the cooling device installed in the off-road vehicle shown in FIG. 12.
Figure 16:
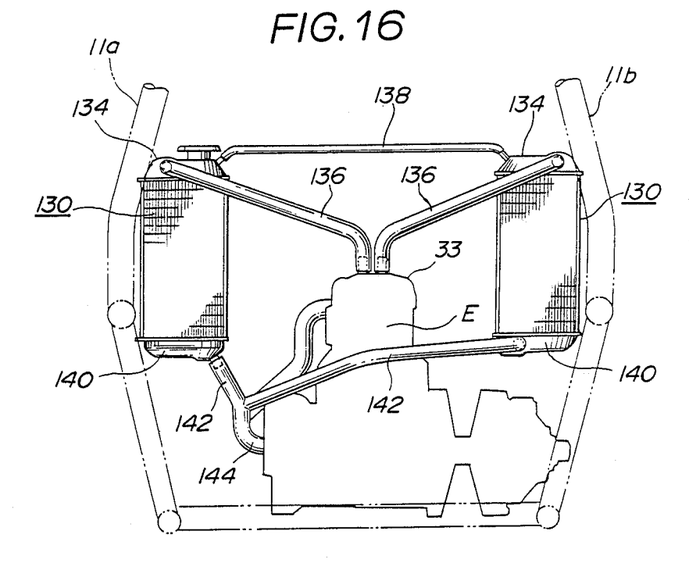
FIG. 16 is an enlarged rear view of the cooling device of FIG. 15.

FIGS. 12 through 16 show a cooling device according to another embodiment of the present invention. Those parts in FIGS. 12 through 16 which are identical to those in the preceding embodiment are denoted by identical reference numerals. As shown in FIGS. 15 and 16, the cooling device of this embodiment differs from the previous embodiment in that two laterally spaced radiators 130 are mounted on the central roll bar legs 11a, 11b by brackets 132.

An upper tank 134 mounted on the top of each of the radiators 130 is connected to the cylinder 33 of the engine E by an inlet hose 136. The upper tanks 134 on the radiators 130 are held in communication with each other by a connecting hose 138. Lower tanks 140 mounted on the bottoms of the respective radiators 130 are also coupled to each other by a connecting hose 142, which has a branch 144 connected to the engine E. Cooling water circulates and the radiators 130 operate in the same manner as described with reference to the previous embodiment. Since the radiators 130 are positioned near the opposite sides of the vehicle frame, a sufficient amount of cooling ram air can be supplied to the radiator cores. Although fans are omitted from illustration, they may be located behind the radiators by shrouds for achieving an increased cooling efficiency as with the previous embodiment.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

What is claimed is:

1. A cooling device in an off-road vehicle including a vehicle frame having a pair of main pipe members spaced from each other transversely of the vehicle and extending longitudinally of the vehicle, said main pipe members having rear portions joined to each other, a central roll bar mounted on said main pipe members substantially centrally in their longitudinal direction, and a rear roll bar coupled between the rear ends of said main pipe members and said central roll bar, and an engine mounted on a lower portion of said vehicle frame rearwardly of said central roll bar, said cooling device comprising:
   a radiator for cooling said engine in order to keep the engine at a temperature suitable for operation thereof; and
   said radiator being positioned in a space surrounded by said main pipe members, said central roll bar, and said rear roll bar, and mounted on a support pipe extending and joined between said main pipe members.

2. A cooling device according to claim 1, further including a fan, a fan motor for rotating said fan, and a shroud for protecting said fan and said fan motor, said shroud being mounted on a rear surface of said radiator, said fan motor being fixedly accommodated in said shroud.

3. A cooling device according to claim 2, wherein said radiator comprises a radiator core for radiating heat from cooling water which has been heated in said engine, an upper tank mounted on an upper surface of said radiator core, and a lower tank mounted on a lower surface of said radiator core, said shroud having upper and lower portions fixed to said upper and lower tanks, respectively.

4. A cooling device according to claim 1, further including a reservoir tank having an upwardly curved upper surface, said radiator comprising an upstanding radiator core, an upper tank mounted on an upper surface of said radiator core and coupled to said reservoir tank through a connecting hose, and a lower tank mounted on a lower surface of said radiator core and coupled to said engine through a connecting tube, said upwardly curved upper surface of said reservoir tank having a rear edge disposed closely to and lying at substantially the same height as that of a lower edge of said radiator core.

5. A cooling device according to claim 4, wherein said upwardly curved upper surface of said reservoir tank includes first and second curved portions, said second curved portion having a smaller gradient than that of said first curved portion.

6. A cooling device for keeping an engine mounted on a vehicle having a pipe frame at a prescribed temperature, comprising:
   a radiator vertically mounted on said frame and including a radiator core for radiating heat from cooling water which has been heated in said engine, an upper tank mounted on an upper surface of said radiator core and coupled to said engine through a connecting hose, and a lower tank mounted on a lower surface of said radiator core and coupled to said engine through a connecting hose;
   a fan for increasing the flow speed of air flowing through said radiator core;
   a fan motor by which said fan is rotatably supported; and
   a shroud for protecting said fan motor, said shroud having upper and lower portions fixed to rear surfaces of said upper and lower tank of the radiator, respectively, said fan motor being fixedly accommodated in said shroud.

7. A cooling device according to claim 6, wherein said radiator is mounted on a rear cross member of said pipe frame.

8. A cooling device according to claim 6, further including a grille attached to a front surface of said radiator, said grille including an air guide for directing ram air to said radiator core.

9. A cooling device according to claim 6, further including a reservoir tank having an upwardly curved upper surface, said upwardly curved upper surface having a rear edge disposed closely to and lying at substantially the same height as that of a lower edge of said radiator core.

10. A cooling device according to claim 9, wherein said upwardly curved upper surface of said reservoir tank includes first and second curved portions, said second curved portion having a smaller gradient than that of said first curved portion.

11. A cooling device in an off-road vehicle including a vehicle frame having a pair of main pipe members spaced from each other transversly of the vehicle and extending longitudianlly of the vehicle, said main pipe members having rear portions joined to each other, a central roll bar mounted on said main pipe members substantially centrally in their longitudinal direction, and a rear roll bar coupled between the rear ends of said main pipe members and said central roll bar, and an engine mounted on a lower portion of said vehicle frame rearwardly of said central roll bar, said cooling device comprising:
   at least one radiator for cooling said engine in order to keep the engine at a temperature suitable for operation thereof; and
   said radiator being positioned in a space surrounded by said main pipe members, said central roll bar, and said rear roll bar, and mounted on said central roll bar.

12. A cooling device according to claim 11, wherein two laterally spaced radiators are mounted respectively on laterally spaced members of said central roll bar.

* * * * *

UNITED STATES PATENT AND TRADEMARK OFFICE
CERTIFICATE OF CORRECTION

PATENT NO. : 4,828,017
DATED : May 9, 1989
INVENTOR(S) : Watanabe et al.

It is certified that error appears in the above-identified patent and that said Letters Patent is hereby corrected as shown below:

Column 1, line 45, change "be advantageously" to --have a--.
Column 1, line 51, change "advantageously be" to --be advantageously--.
Column 1, line 67, correct the spelling of "existing".
Column 2, line 9, before "made" insert --is--.
Column 2, line 23, after "includes" insert --a--.
Column 2, line 61, change "longitudinally" to longitudinal--.
Column 3, line 10, change "elevatinal" to --elevational--.
Column 3, line 49, change "off road" to --off-road--.
Column 4, line 11, change "17" to --15--.
Column 4, line 12, change "15" to --17--.
Column 4, line 41, before "atmosphere" insert --the--.
Column 4, line 51, change "an" to --air--.
Column 4, line 52, after "69" insert a comma.
Column 5, line 3, after "temperature" insert --of the cooling water reaches a certain temperature--.
Column 5, line 16, correct the spelling of "radiator".
Column 8, line 21 (Claim 6, line 19), change "tank" to --tanks--.
Column 8, line 45 (Claim 11, line 3), change "transversly" to --transversely--
Column 8, line 46 (Claim 11, line 4), correct the spelling of "longitudinally"

Signed and Sealed this

Thirtieth Day of January, 1990

*Attest:*

JEFFREY M. SAMUELS

*Attesting Officer*            Acting Commissioner of Patents and Trademarks